(12) United States Patent
McDowall et al.

(10) Patent No.: US 7,567,731 B2
(45) Date of Patent: Jul. 28, 2009

(54) METHOD AND SYSTEM FOR SIMULTANEOUSLY REGISTERING MULTI-DIMENSIONAL TOPOGRAPHICAL POINTS

(75) Inventors: Tom McDowall, Melbourne, FL (US); Jake Auxier, West Melbourne, FL (US); Mark Rahmes, Melbourne, FL (US); Ray Fermo, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 948 days.

(21) Appl. No.: 10/892,047

(22) Filed: Jul. 15, 2004

(65) Prior Publication Data

US 2006/0013443 A1    Jan. 19, 2006

(51) Int. Cl.
G06K 9/00 (2006.01)
G06K 9/32 (2006.01)
H04N 9/74 (2006.01)

(52) U.S. Cl. .................. 382/294; 382/154; 348/578
(58) Field of Classification Search ............... 382/154, 382/294
See application file for complete search history.

(56) References Cited

U.S. PATENT DOCUMENTS

| | | | |
|---|---|---|---|
| 5,644,386 A * | 7/1997 | Jenkins et al. | 356/4.01 |
| 5,649,032 A | 7/1997 | Burt | |
| 5,751,838 A | 5/1998 | Cox et al. | |
| 5,844,614 A | 12/1998 | Chong | |
| 5,875,108 A | 2/1999 | Hoffberg | |
| 5,901,246 A | 5/1999 | Hoffberg | |
| 5,988,862 A | 11/1999 | Kacyra | |
| 6,081,750 A | 6/2000 | Hoffberg | |
| 6,246,468 B1 | 6/2001 | Dimsdale | |
| 6,330,523 B1 | 12/2001 | Kacyra | |
| 6,400,996 B1 | 6/2002 | Hoffberg | |
| 6,405,132 B1 | 6/2002 | Breed | |
| 6,418,424 B1 | 7/2002 | Hoffberg | |
| 6,420,698 B1 | 7/2002 | Dimsdale | |
| 6,512,518 B2 | 1/2003 | Dimsdale | |
| 6,512,857 B1 * | 1/2003 | Hsu et al. | 382/294 |
| 6,512,993 B2 | 1/2003 | Kacyra | |
| 6,526,352 B1 | 2/2003 | Breed | |
| 6,587,601 B1 | 7/2003 | Hsu | |

(Continued)

OTHER PUBLICATIONS

Zhang Z, "Iterative Point Matching for Registration of Free-Form Curves and Surfaces," International Journal of Computer Vision, 13, 2, 1994, pp. 119-152.*

(Continued)

*Primary Examiner*—Bhavesh M Mehta
*Assistant Examiner*—Hadi Akhavannik
(74) *Attorney, Agent, or Firm*—GrayRobinson, PA (57) ABSTRACT

A method for registering multi-dimensional topographical data points representing a multi-dimensional object, comprises: a) receiving a plurality of points representing a plurality of overlapping frames of a surface of the multi-dimensional object; b) finding for each point in a first frame a corresponding closest point in each of a plurality of subsequent frames; c) determining a rotation and translation transformation for each of the plurality of frames so that corresponding closest points are aligned; d) determining a cost for performing each rotation and translation transformation; and e) repeating steps b) through d) for additional frames to provide an optimum transformation.

19 Claims, 5 Drawing Sheets

U.S. PATENT DOCUMENTS

| | | | |
|---|---|---|---|
| 6,654,690 | B2 | 11/2003 | Rahmes et al. |
| 6,711,293 | B1 | 3/2004 | Lowe |
| 6,738,532 | B1 * | 5/2004 | Oldroyd .................... 382/294 |
| 6,741,341 | B2 * | 5/2004 | DeFlumere .............. 356/141.1 |
| 6,864,828 | B1 * | 3/2005 | Golubiewski et al. ..... 342/25 C |
| 7,242,460 | B2 * | 7/2007 | Hsu et al. ................. 356/4.01 |
| 2002/0012071 | A1 * | 1/2002 | Sun ........................... 348/578 |
| 2002/0017985 | A1 * | 2/2002 | Schofield et al. ............ 340/436 |
| 2002/0059042 | A1 | 5/2002 | Kacyra |
| 2002/0145607 | A1 | 10/2002 | Dimsdale |
| 2002/0149585 | A1 | 10/2002 | Kacyra |
| 2002/0158870 | A1 | 10/2002 | Brunkhart |
| 2003/0001835 | A1 | 1/2003 | Dimsdale |
| 2005/0089213 | A1 * | 4/2005 | Geng ......................... 382/154 |
| 2007/0185946 | A1 * | 8/2007 | Basri et al. ................. 708/200 |

OTHER PUBLICATIONS

Andre Kaup, Reduction of "Ringing Noise in Transform Image Coding Using a Simple Adaptive Filter" Siemens Corporate Technology Networks and Video Communications, Munich, Oct. 1998.

Michael Greenspan, Guy Godin, "A Nearest Neighbor Method for Efficient ICP" Visual Information Technology Group, Ontario, Canada, Jun. 2001.

Jacob Marner, "Computational Geometry" May 2000.

Bryan Hanks, "Math 4397 Class Notes" Jan. 29, 2002.

Gerald Dalley, Patrick Flynn, "Range Image registration: A Software Platform and Empirical Evaluation" Signal Analysis and Machine Perception Laboratory, Ohio State University, Jun. 2001.

J.A. Williams, M. Bennamoun, "Simultaneous Registration of Multiple Point Sets Using Orthonormal Matrices" Queensland University of Technology, Australia, Jun. 2000.

Andrew W. Fitzgibbon, "Robust Registration of 2D and 3D Point Sets" Department of Engineering Science, University of Oxford, Dec. 2003.

* cited by examiner

METHOD AND SYSTEM FOR SIMULTANEOUSLY REGISTERING MULTI-DIMENSIONAL TOPOGRAPHICAL POINTS

CROSS-REFERENCE TO RELATED APPLICATIONS

This application relates to technology similar to that discussed in concurrently filed U.S. patent application Ser. No. 10/891,950 now U.S. Letters Patent No. 7,298,891 entitled "BARE EARTH DIGITAL ELEVATION MODEL EXTRACTION FOR THREE-DIMENSIONAL REGISTRATION FROM TOPOGRAPHICAL POINTS", Ser. No. 10/892,055 now U.S. Letters Patent No. 7,304,645 entitled "SYSTEM AND METHOD FOR IMPROVING SIGNAL TO NOISE RATIO IN 3-D POINT DATA SCENES UNDER HEAVY OBSCURATION", and Ser. No. 10/892,063 entitled "METHOD AND SYSTEM FOR EFFICIENT VISUALIZATION METHOD FOR COMPARISON OF LIDAR POINT DATA TO DETAILED CAD MODELS OF TARGETS" which are assigned to the same assignee as the present application and are incorporated by reference herein in their entirety.

FIELD OF THE INVENTION

The invention disclosed broadly relates to the field of processing of topographical data and more particularly relates to a system and method for registering multidimensional topographical points.

BACKGROUND OF THE INVENTION

In generating a complete digital model of a multidimensional object, such as a varied geographic terrain, it is necessary to combine several overlapping range images (also known as frames or volumes of data points) taken from different perspectives. The frames are pieced together using a process known as registration to produce a multidimensional model of the object. In a registration process the required translation and rotation of the different frames is determined. This process uses six parameters: $\Delta x$, $\Delta y$, $\Delta z$, $\Delta \omega$, $\Delta \kappa$, and $\Delta \phi$, where the first three parameters relate to the translation of the respective x, y, and z coordinates and the second three parameters, each relate to rotation on each of the three respective x, y, and z axes. Known methods of registering frames comprising large numbers of data points from different and overlapping perspectives of an object are computationally intensive and hence time consuming. However, many applications of the registration technology require a fast response from the time that the frames are acquired. Therefore, there is a need for a faster and more robust system for registering multidimensional data points.

Figure 1:
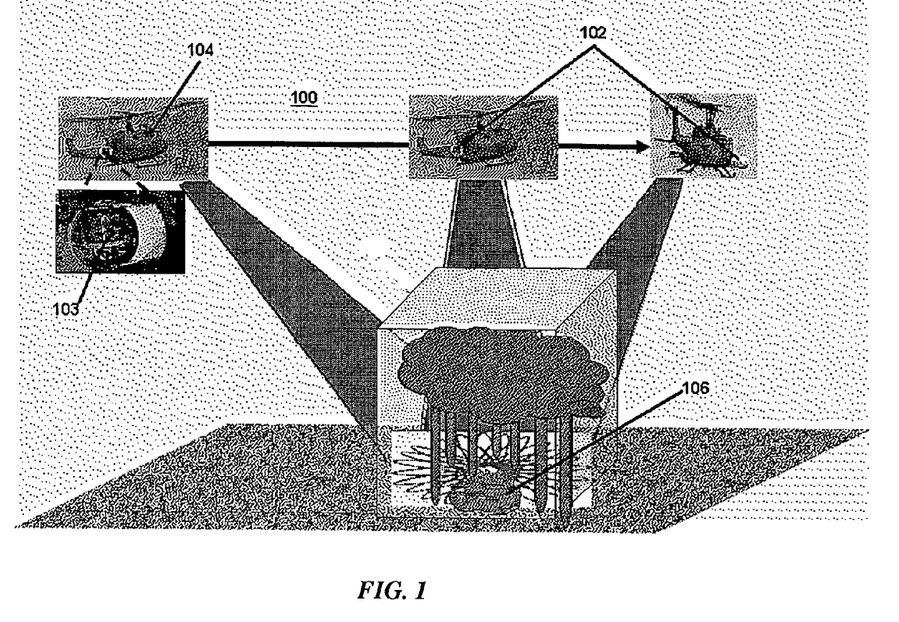
FIG. 1 is a depiction of an airborne LIDAR instrument for processing images of a tree-covered terrain concealing a target.

Known methods of topographical point collection include imaging Laser RADAR (LIDAR) and IFSAR (Interferometric Synthetic Aperture Radar). Referring to FIG. 1, there is shown an example of an airborne LIDAR system 100. The system 100 comprises a LIDAR instrument 102 mounted on the bottom of an aircraft 104. Below the aircraft is an area comprising a ground surface partially obscured by a canopy formed by trees and other foliage obstructing the view of the ground (earth) from an aerial view. The LIDAR instrument 102 emits a plurality of laser light pulses which are directed toward the ground. The instrument 102 comprises a sensor 103 that detects the reflections/scattering of the pulses. The LIDAR instrument 102 provides data including elevation versus position information from a single image. It should be noted however, that multiple frames or portions of the area from different perspectives are used to generate the image. The tree canopy overlying the terrain also results in significant obscuration of targets (e.g. tank 106) under the tree canopy. The points received by the sensor 103 of instrument 102 from the ground and the target 106 are thus sparse. Hence, a robust system for processing the points is required in order to generate an accurate three-dimensional image. Moreover, to be of the most tactical and strategic value, an image of the ground wherein the target 106 can be perceived easily must be available quickly.

SUMMARY OF THE INVENTION

According to an embodiment of the invention a method for registering multi-dimensional topographical data points comprises steps of: receiving a plurality of digital elevation model points representing a plurality of overlapping frames of a geographical area; finding for each of a plurality of points in a first frame a corresponding closest point in a plurality of subsequent frames; determining a rotation and translation transformation for each frame; determining a cost for performing each rotation and translation transformation; and iterating the above process for additional frames for a number of times or until an abort criterion is reached to optimize the cost of registering the frames. The above-described method can also be carried out by a specialized or programmable information processing system or as a set of instructions in a computer-readable medium such as a CD ROM or DVD or the like.

DETAILED DESCRIPTION

Figure 2:
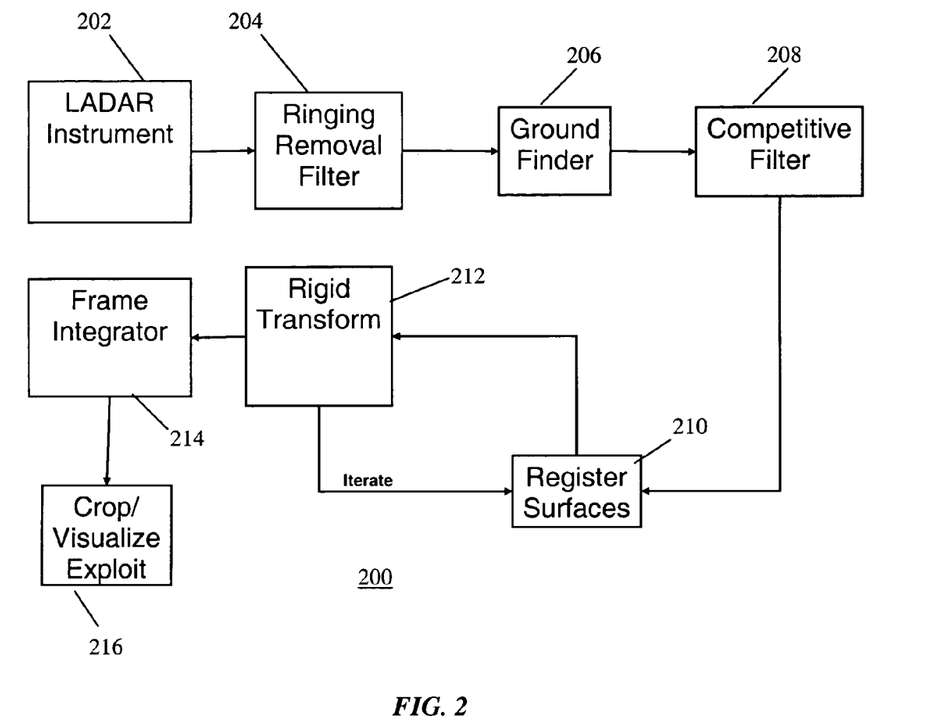
FIG. 2 is a high level block diagram showing an information processing system according to an embodiment of the invention.

Referring to FIG. 2, there is shown high level block diagram showing an information processing system 200 using an embodiment of the invention. The system 200 comprises a source 202 of topographical data points. These points are preferably a plurality of three-dimensional (3D) topographical point values provided by a LIDAR instrument 102 as discussed with respect to FIG. 1.

The LIDAR instrument 202 creates a plurality of frames (or volumes) of images of points in a conventional manner. Each frame comprises the points collected by the sensor 103 over a given period of time (an exposure) as the aircraft 104 moves over a terrain. In the preferred embodiment, this time period is one-third of a second and, with current instruments, that exposure results in collection of hundreds of thousands of points by the LIDAR sensor 103. Each point is defined by a set of three-dimensional coordinates (x, y, z).

One way that the present system improves on the performance of the prior art is, at least in part, by using only data points representing the ground surface and a target 106 (if present) and not the obstructions at a height greater than a predetermined threshold (such as six feet) above the ground. Using only the ground points greatly reduces the number of points that are to be down-linked and processed and thus reduces the time required to produce a model of the terrain.

The data provided by the LIDAR instrument 102 may comprise an effect known as ringing (or corona effect). Ringing is caused by scattering of the light produced by a target area that causes a false return. A ringing removal filter (circuitry or program logic) 204 is used for filtering the received 3D topographical points to remove the ringing. Not all topographical data includes ringing. Therefore, the filter 204 is not always required. The ringing is removed by ignoring all data beyond a selected azimuth setting, thus eliminating any false images. The selection of the azimuth is governed by statistical data or determined heuristically. The use of the ringing removal filter 204 in system 200 increases the signal to noise ratio at the output of the filter 204. The details of an example of a ringing filter are discussed in a patent application being filed concurrently herewith under the docket number GCSD-1526.

The output provided by the ringing noise removal filter 204 is received at a ground finder 206. The ground finder 206 is used for finding a ground surface using the plurality of raw topographical points (e.g., from the LIDAR instrument 102) and their coordinates and providing a plurality of ground points representing a plurality of frames representing patches of the ground surface and the target 106. The ground finder 206 finds the ground by extracting ground points from its input and filtering out above-ground obstruction points such as those from the top of the trees. As expected, the number of LIDAR pulses that reach the ground through the trees and other foliage is much smaller than those emitted by the LIDAR source (or emitter). Therefore, the points of light from the ground (ground points) detected at the LIDAR sensor is commensurately smaller than the total number received from the totality of the terrain below the aircraft 104.

The ground finder 206 thus extracts a ground surface shell (a set of points defining a three-dimensional surface) from the topographical data provided at the output of the ringing removal filter 204. The output of the ground finder 206 comprises a set of data representing a ground surface that includes the target 106. The ground points are determined by isolating them from the above-ground obstructions provided by the trees and other foliage.

The ground finder 206 also operates to make sure that the ground is continuous so that there are no large changes in the topography. This is accomplished by creating a two-dimensional (2D) grid for the ground surface and determining the height of the ground at each grid component. Each grid component preferably represents a square part of the ground that is one meter on each side. Once this data is collected for the entire grid, the ground finder 206 eliminates points that appear to be out of place or which are based on insufficient data. The decision on which points to eliminate is based on artifacts programmed into the ground finder 206. The ground finder 206 is further programmed to ignore any points higher than a predetermined height (e.g., the height of a person, such as six feet) when calculating the contour of the ground surface. The predetermined height is determined by rule-based statistics. That is done to eliminate any structures that are not likely to be part of the ground. Thus, the output of the ground finder 206 provides a more faithful representation of the actual ground surface than systems using the treetop data.

The output of the ground finder 206 is provided to a competitive filter 208. The competitive filter 208 is used to work on ground surface data (ground points) provided by the ground finder 206. The ground points are filtered using the competitive filter to obtain a 3D shell of digital elevation model (DEM) points. The competitive filter 208 filters ground surface data not tied to geospatial coordinates such as the data collected by the LIDAR instrument 202. The filter 208 works by performing a polynomial fit of predetermined order for each frame of points. This is done by determining which polynomial best represents the set of points in the frame. One example is a first order polynomial (a tilted plane) and the other is a numeric average (zero order). In the preferred embodiment, the average and the tilted plane (respectively, zero and first order polynomials) compete for the best fit in any given frame of points. Other embodiments may utilize higher order polynomials. A method for fitting polynomials in frames is discussed in U.S. patent application Ser. No. 09/827,305, the disclosure of which is hereby incorporated herein by reference in its entirety.

Thus, for every frame of points the filter 208 determines a tilted plane that fits the points in that frame. Each flame is a micro frame that covers a patch constituting a small portion of the total area produced by registration. The output of the competitive filter 208 is a contour comprising a plurality of (e.g., thirty) planes, one for each frame acquired. An optimal estimate of the ground surface allows for obscuration by the trees and foliage to produce an image of a partially obscured target. Once each frame is processed by the filter 208 the output is a set of unregistered DEM surfaces. In this embodiment each surface is a ground surface; however it should be appreciated that the method and system of the invention can be used on any surface of a target object.

The data produced by the competitive filter 208 DEM is not suitable for rendering an image that is useful to a user of the system 200. To produce a viewable image we must first complete a registration process. In the preferred embodiment the registration is performed by an iterative process performed by blocks 210 (a registration engine) and 212 (a rigid transform engine). In this embodiment, to obtain a 3D representation of the ground surface, several sets of data (frames) are automatically pieced together to create an image of an entire target area or surface. Each set of data (or frame) is taken from a different perspective providing a different view of the surface features. Registration determines the relative positions of each of the points representing the surface as the sensor 103 moves over that surface. Thus different views of the surface area are aligned with each other by performing a translation and rotation of each frame to fit an adjacent frame or frames.

Block 210 aligns points in adjacent frames. It does this by finding in a second frame the closest point for each of a plurality of points in a first frame. Once the closest point is found the points are aligned such that the frames make a good fit representing the registered model or image. This is known as a pair wise process. Each iteration of the process produces a better fit and the process continues until an optimum alignment is realized. This is accomplished by determining a computation cost associated with each rotation and translation of each frame to fit other frames. Using the information (matches between adjacent frames) collected in each iteration, subsequent iterations correct the alignment until an abort criterion is reached. This criterion can be the completion of a number of iterations or the accomplishment of a predetermined goal. In this embodiment, we perform the closest point search for each point in a first frame to locate closest points in more than one other frame by entering observations from each iteration into a matrix and then solving the matrix at once so that all transformations are performed substantially simultaneously (i.e., an n-wise process).

Block 212 receives information on the alignment of points produced at block 210 during each iteration. Processor logic in block 212 uses the information provided by block 210 to determine transforms (i.e., angles and displacements) for each frame as they are fitted together. The output of block 212 is thus a set of angles and displacements ($\Delta x$, $\Delta y$, $\Delta z$, $\Delta \omega$, $\Delta \kappa$, and $\Delta \varnothing$) for the frames to be pieced together.

The frame integrator block 214 receives the output of the rigid transform block 212 and integrates all of the DEM points produced by the competitive filter 208 according to the rigid transform information.

In the preferred embodiment the iterative process is repeated several (e.g., five) times to determine an optimum rotation and translation for the frames. We preferably use the algorithm presented in J. A. Williams and M. Bennamoun, "Simultaneous Registration of Multiple Point Sets Using Orthonormal Matrices" Proc. IEEE Int. Conf. on Acoustics, Speech and Signal Processing (ICASSP June 2000) at pp. 2199-2202, the disclosure of which is hereby incorporated herein by reference.

The iterated transformations discussed above are performed at block 212. Each transformation is a rigid transformation. A transform is said to be rigid if it preserves the distances between corresponding points.

In the frame integrator block 214, integration of the registered volumes produced by block 212 is performed and the result is cropped to a size and shape suitable for presentation and then it is visually exploited at block 216 to show the structure of the target. The result is a 3D model that is displayed quickly. In the embodiment discussed herein a target such as the tank 106 hidden under the treetops as shown in FIG. 1 is depicted without the obscuring effect of the canopy of trees over the tank 106.

As discussed above, the speed of the registration process is critical in many applications such as locating a hidden target such as a tank 106 in a combat environment. One way to speed up the process is to improve the speed of the search for corresponding points from frame to frame. This can be accomplished by using any of several well-known k-D tree algorithms. Thus, the data points from each frame are mapped into a tree structure such that the entire set of points in an adjacent frame do not have to be searched to find the closest point for a given point in a first frame. An example of a k-D tree algorithm is found at the web site located at http://www.rolemaker.dk/nonRoleMaker/uni/algogem/kdtree.htm.

Figure 3:
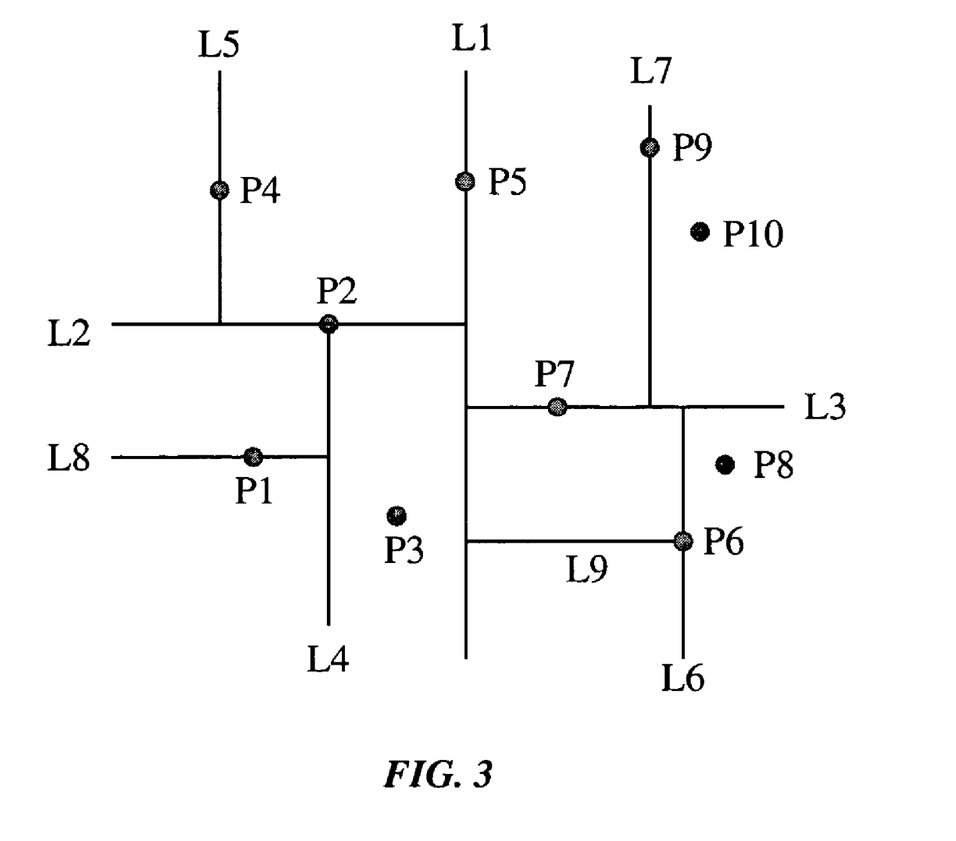
FIG. 3 is a two-dimensional set of points representing a surface for one frame such as a frame of LIDAR points.

Referring to FIG. 3, there is shown a set of points (P1-P10) representing a surface for one frame such as a frame of LIDAR points. At each step, the region is split into two regions, each region containing half of the points. This process is repeated until each point is in its own region by itself. As an example, if one starts with 8 points and is looking for a particular point, cut it down to four points by querying which half it is located in, then down to two, and finally to one. This was just three steps, which is easier than asking all eight points. The difference is especially huge the more points there are. If there are 256 points, one can usually find a point in eight tries instead of 256.

Figure 4:
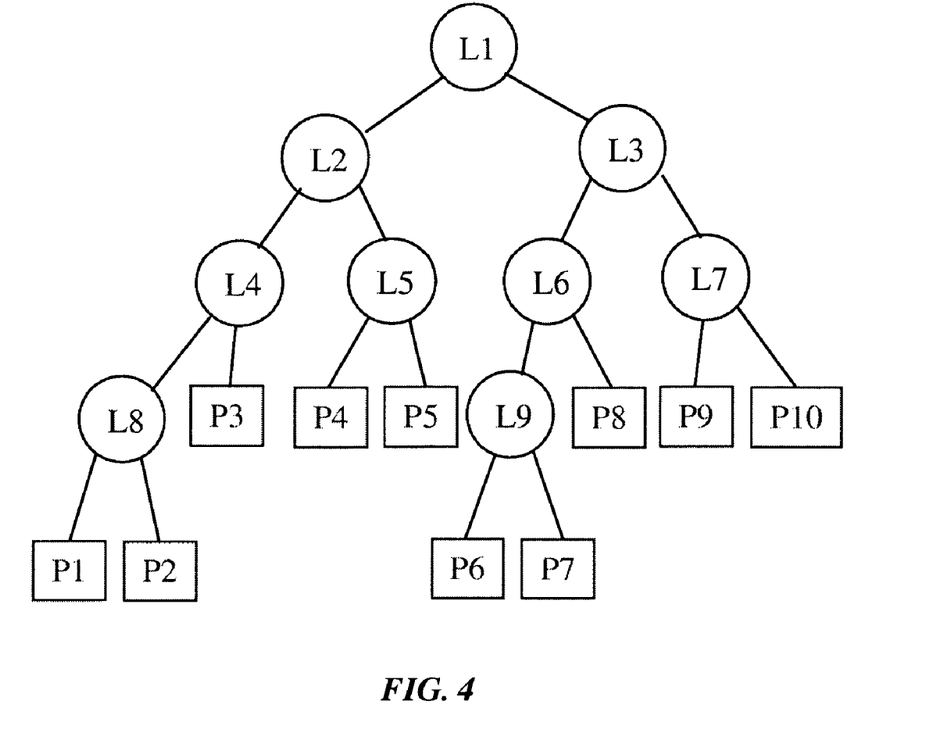
FIG. 4 is a depiction of a k-D tree used to search for the closest points.

The registration engine 210 generates lines L1-L8. These lines are used to build the k-D tree and shown in FIG. 4. The k-D tree is created by recursively dividing the points P1-P10 in x and y directions. In the k-D tree each line of FIG. 3 is represented by a node (circles) and each point (rectangle) is connected to a node. The tree is used to reduce the searching time required to find the point closest to any given point. For example, if searching for the point closest to P10, one would traverse node L1 to L3, and then to L7 and consider only point P9 and not P1. Note that this example is 2D, but our application uses 3D points.

Figure 5:
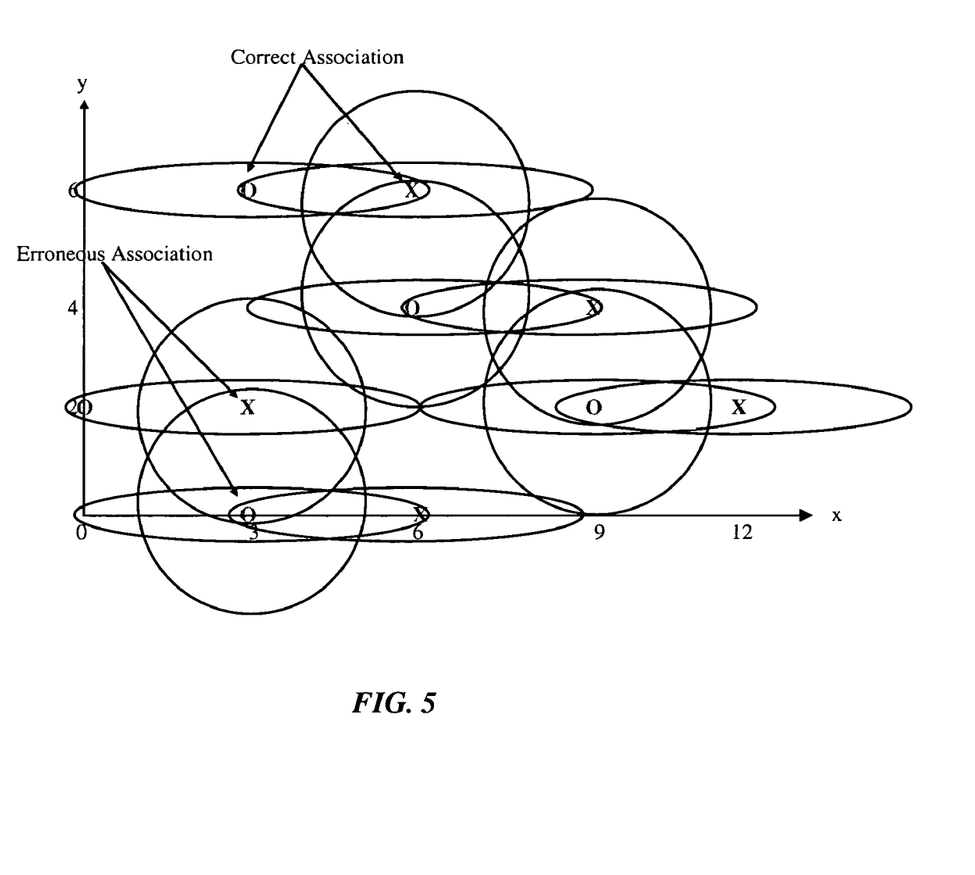
FIG. 5 is a graph of a plurality of points illustrating the benefit of statistical distance versus Euclidean distance.

FIG. 5 is a graph of a plurality of points illustrating the benefit of statistical distance versus Euclidean distance. Points shown as Os are from a LIDAR-produced frame A and points shown as Xs are from a LIDAR-produced frame B. Assume that these frames or volumes are overlapping. We do not know ab initio which points in frame A align with which points in frame B. We begin by comparing the coordinates for each pair of points to be aligned. For any given point in frame A we consider other points within an area in frame B. The distances between any given pair of points is represented as circles or ellipses. The circles represent Euclidean distances and the ellipses represent the Mahalanobis distances.

The quantity r in the equation $r^2 = (x-m_x)' C_x^{-1} (x-m_x)$ is called the Mahalanobis distance from the feature vector x to the mean vector mx, where Cx is the covariance matrix for x. It can be shown that the surfaces on which r is constant are ellipsoids that are centered about the mean $m_x$. The Mahalanobis distance is used to align points up and down (i.e., along the z axis). This process recognizes the observed fact that points appear farther in the z direction than they actually are. By aligning points using the elliptical areas to locate corresponding points in other frames we achieve a more accurate model than by merely using Euclidean distances represented by the circles.

Therefore, while there has been described what is presently considered to be the preferred embodiment, it will be understood by those skilled in the art that other modifications can be made within the spirit of the invention.

We claim:

1. A method for registering a set of frames of 3-dimensional digital elevation model data points which include both ground points representing a 3-dimensional surface and obstruction points which represent an obstruction lying above the 3-dimensional surface and are positionally interspersed among the ground points, said method comprising the steps of:
    (a) extracting a ground surface shell from the set based on a plurality of ground points from which the obstruction points have been isolated;
    (b) finding a plurality of pairs of corresponding closest points in overlapping frames of said ground surface shell such that a plurality of said pairs of said corresponding closest points are found for each one of a plurality of pairs of said overlapping frames;
    (c) determining a plurality of 3-dimensional transformations based on said corresponding closest points found in step (a), each respective one of said transformations defining a 3-dimensional rotation and translation representing an alignment of a first frame and a second frame of a respective one of said overlapping pairs of frames, said transformations being determinable without reliance on ego motion information, and
    (d) substantially simultaneously registering all frames included in said plurality of pairs of said overlapping frames by performing a rigid transform according to a matrix in which all of said transformations are represented.

2. The method of claim 1 further comprising the step of optimizing said pair-wise transformations.

3. The method of claim 2 wherein said optimizing step comprises the step of iteratively repeating steps (b) and (c).

4. The method of claim 1 wherein a Mahalanobis distance is used for determining which of said points in said overlapping frames constitute a said pair of corresponding closest points.

5. The method of claim 2 further comprising the step of determining a cost associated with research said pair-wise transformations and continuing said step of iteratively repeating said step of iteratively repeating steps (b) and (c) subject to an abort criterion related to said cost.

6. The method of claim 1 further comprising the step of carrying out an iterative process which comprises the step of iteratively repeating steps (b), (c) and (d).

7. A system for registering a set of frames of 3-dimensional digital elevation model points which include both ground points representing a 3-dimensional surface and obstruction points which represent an obstruction lying above the 3-dimensional surface and are positionally interspersed among the ground points, said system comprising:
 a ground finder for isolating the obstruction points from the ground points;
 a competitive filter for obtaining a ground surface shell from a plurality of ground points provided by said ground finder, said ground surface shell including a representation of each respective one of said frames;
 a registration engine coupled to said competitive filter for (i) finding a plurality of pairs of corresponding closest points in overlapping frames of said ground surface shell such that a plurality of said pairs of said corresponding closest points are found for each one of a plurality of pairs of said overlapping frames, and (ii) determining a plurality of 3-dimensional transformations based on said corresponding closest points; each respective one of said transformations defining a 3-dimensional rotation and translation representing an alignment of a first frame and a second frame of a respective one of said overlapping pairs of frames, said transformations being determinable without reliance on ego motion information, and
 a transform engine coupled to said registration engine for substantially simultaneously registering all of said frames included in said plurality of pairs of said overlapping frames by performing a rigid transform according to a matrix in which all of said transformations are represented.

8. A computer readable medium comprising program instructions for:
 (a) extracting a ground surface shell from the set based on a plurality of ground points from which the obstruction points have been isolated;
 (b) finding a plurality of pairs of corresponding closest points in overlapping frames of said ground surface shell such that a plurality of said pairs of said corresponding closest points are found for each one of a plurality of pairs of said overlapping frames;
 (c) determining a plurality of 3-dimensional transformations based on said corresponding closest points found in step (a), each respective one of said transformations defining a 3-dimensional rotation and translation representing an alignment of a first frame and a second frame of a respective one of said overlapping pairs of frames, said transformations being determinable without reliance on ego motion information, and
 (d) substantially simultaneously registering all frames included in said plurality of pairs of said overlapping frames by performing a rigid transform according to a matrix in which all of said transformations are represented.

9. The method of claim 1, wherein step (b) comprises the step of searching a k-D tree for finding said corresponding closest points.

10. The method of claim 1, wherein each of said points in said overlapping frames is represented by x, y, z coordinates and a Mahalanobis distance in the z direction is used to determine which of said points comprise said closest corresponding points.

11. The method of claim 1, further comprising the step of integrating said plurality of said frames after said registration step has been carried out to produce an integrated 3D model representing the 3-dimensional surface.

12. The method of claim 1, further comprising the step of displaying said integrated 3D model of the 3-dimensional surface.

13. The method of claim 11, wherein the ground points comprise both (i) 3-dimensional digital elevation model data points derived from a target partially obstructed by said obstruction and (ii) 3-dimensional digital elevation model topographical data points representing a geographical area in the vicinity of said target, and wherein said 3D model comprises a model which represents both said geographical area and said target.

14. The method of claim 3, further comprising the step of displaying said 3D model show the structure of said target.

15. The system of claim 7, wherein said registration engine finds each said pair of corresponding closest points by searching a k-D tree.

16. The system of claim 7, further comprising a frame integrator for integrating said frames which have been registered by said transform engine to provide an integrated 3D model representing said 3-dimensional surface.

17. The system of claim 7, further comprising a display for displaying said 3D model representing said 3-dimensional surface.

18. The medium of claim 8, wherein instruction (b) comprises an instruction for organizing the points in each frame into a k-D tree structure and searching the k-D tree for each said corresponding closest 3-dimensional DEM point.

19. The medium of claim 8, a wherein each of said points in said overlapping frames is represented by x, y, z coordinates and a Mahalanobis distance in the z direction is used to determine which of said points comprise said closest corresponding points.

* * * * *